US010637943B2

(12) United States Patent
Sheppard

(10) Patent No.: US 10,637,943 B2
(45) Date of Patent: Apr. 28, 2020

(54) SYSTEM AND METHOD FOR COMPOSITE PRESENCE SUBSCRIPTIONS

(71) Applicant: Avaya Inc., Basking Ridge, NJ (US)

(72) Inventor: Mark Sheppard, Raheny (IE)

(73) Assignee: Avaya Inc., Basking Ridge, NJ (US)

(*) Notice: Subject to any disclaimer, the term of this patent is extended or adjusted under 35 U.S.C. 154(b) by 982 days.

(21) Appl. No.: 13/631,396

(22) Filed: Sep. 28, 2012

(65) Prior Publication Data
US 2014/0095602 A1 Apr. 3, 2014

(51) Int. Cl.
*H04L 29/08* (2006.01)
(52) U.S. Cl.
CPC .............. *H04L 67/24* (2013.01); *H04L 67/26* (2013.01)
(58) Field of Classification Search
CPC ................................ H04L 67/24; H04L 67/26
USPC .......................................................... 709/204
See application file for complete search history.

(56) References Cited

U.S. PATENT DOCUMENTS

| 7,596,210 | B2* | 9/2009 | Blohm | H04M 3/42374 370/522 |
|---|---|---|---|---|
| 2006/0034195 | A1* | 2/2006 | Blaiotta et al. | 370/261 |
| 2006/0126601 | A1* | 6/2006 | Kim | H04L 67/16 370/352 |
| 2006/0262917 | A1* | 11/2006 | Marsico | 379/220.01 |
| 2007/0123226 | A1* | 5/2007 | Liang | G06F 21/6218 455/414.1 |
| 2007/0266076 | A1* | 11/2007 | Cox | H04L 51/046 709/203 |
| 2008/0125157 | A1* | 5/2008 | Zhang | H04L 67/28 455/518 |
| 2008/0299969 | A1* | 12/2008 | Shatsky | 455/435.1 |
| 2010/0017472 | A1* | 1/2010 | Benedyk | H04L 67/24 709/204 |
| 2011/0047558 | A1* | 2/2011 | Agulnik | H04L 67/24 719/318 |
| 2011/0219117 | A1* | 9/2011 | Linder | G06Q 10/10 709/224 |
| 2014/0068091 | A1* | 3/2014 | T | H04L 67/24 709/228 |

OTHER PUBLICATIONS

Camarillo, G. et al., "URI Lists in SIP", Feb. 2004, Introduction paragraphs and examples at the end. Available online at http://xml.coverpages.org/draft-camarillo-sipping-uri-list-01.txt.*

(Continued)

*Primary Examiner* — Emmanuel L Moise
*Assistant Examiner* — Xiang Yu
(74) *Attorney, Agent, or Firm* — Sheridan Ross P.C.

(57) ABSTRACT

The present disclosure is directed to methods and systems that include generating an availability request, where the availability request inquires about an availability of each contact in a set of multiple contacts; submitting a composite presence subscribe request to a presence server based on the availability request, where the composite presence subscribe request identifies each contact in the set of multiple contacts; generating, from the presence server, a composite presence report indicating the availability of each contact; and notifying of the availability of each contact.

16 Claims, 8 Drawing Sheets

(56) References Cited

OTHER PUBLICATIONS

Saint-Andre "XEP-0147: XMPP URI Scheme Query Components," XMPP Standards Foundation, © 1999, Last Updated Sep. 13, 2006, 14 pages, retrieved from [http://xmpp.org/extensions/xep-0147.html].
Saint-Andre "XEP-0207: XMPP Eventing via Pubsub," XMPP Standards Foundation, © 1999, Last Updated, Apr. 1, 2007, 15 pages, retrieved from [http://xmpp.org/extensions/xep-0207.html].
Hefczyc et al. "XEP-0267: Server Buddies," XMPP Standards Foundation, © 1999, Last Updated May 29, 2012, 10 pages, retrieved from [http://xmpp.org/extensions/xep-0267.html].

* cited by examiner

SYSTEM AND METHOD FOR COMPOSITE PRESENCE SUBSCRIPTIONS

FIELD

The disclosure relates generally to communication technology and particularly to methods for requesting presence information and creating one or more composite presence notifications indicating the availability of contacts.

BACKGROUND

The convergence of the mobile telephone network, the static telephone network, and the IP network provides a myriad of communication options for users. If one seeks to contact another individual, he or she may do so by electronic mail or e-mail, instant messaging (IM), wired or wireless telephone, personal computer, pager, personal digital assistant (PDA), and Unified Messaging (UM) systems, to name but a few. With so many options, it is difficult, if not impossible, to determine which option at a given point in time will provide the caller with the highest likelihood of contacting the desired individual or contact. Trial and error and guesswork are the typical techniques used to reach the contact, which more often than not leads to a waste of time and frustration on the part of the caller. The concept of unified communications (e.g., the integration of real-time communication services) is increasingly pervasive in corporate communication solutions where users want to find out whether certain contacts (or other users) are available to communicate. A user's availability to communicate is determined from the user's presence information. A contact's presence information is obtained by a watcher (e.g., a user subscribing to that contact) by means of a presence subscription. Further, a contact's availability to communicate is determined from that contact's published presence information. In some embodiments, a user may search for other users in an organization in an unified communications solution, and presence information is rendered along with the search results.

Thus, "presence" is a well known concept in the telecommunications industry. Presence relates to a communication state of a user or contact on a particular client or communication device. In other words, presence and presence information relate to a person having multiple devices with multiple communication paths and a contact's preference or preferred device of availability. "Presence information" typically refers to any information associated with a network node and/or endpoint device, such as a communications device, that is in turn typically associated with a person or entity. Various attempts have been made to provide a presence awareness network (also called a presence system), which would temporally track an individual's usage of selected communication devices to provide a user with the highest likelihood of contacting the individual. Examples of presence information include registration information under the Session Initiation Protocol (SIP) or Extensible Messaging and Presence Protocol (XMPP), information regarding the accessibility of the endpoint device, the endpoint(s) telephone number or address, the recency of use of the endpoint device by the person, recency of authentication by the person to a network component, and the preferences of the contact, such as contact mode preferences or profiles, such as the communication device to be contacted for specific types of contacts or under specific actual scenarios or presence contacts, contact time preferences, impermissible contact types and/or subjects, such as the subjects about which the person does not wish to be contacted, parties who must not be contacted, e.g., a do not call if you are not calling on behalf of a specific person or entity, and parties who can contact at any time, e.g., "I will accept a call from the head of the company regardless of what I am doing." SIP and XMPP have been developed to provide a degree of presence awareness in a communication network. Although other protocols may be equally supportive of presence concepts, SIP and XMPP provide an illustrative basis for the present disclosure.

Current presence systems use presence subscriptions to provide an interested user with an indication as to a contact's availability to communicate. From the contact's side, contacts can publish their presence state (also called presence information) for various configured modes of communication to a presence server, where users can obtain the published presence information by subscribing to the contact's presence information. In a SIP protocol, a user can subscribe to a contact's presence information using a SUBSCRIBE request. In an XMPP protocol, a user can subscribe to a contact's presence information by submitting a presence subscribe packet. In both protocols, a user may subscribe to presence information for any one or more of the user's contacts. Once a presence subscription has been established and authorized, the subscribing user is then notified of any initial presence information and any presence information update for the contacts to which the user is subscribed. Such a notification is referred to as a "report" or "notification" herein. The subscription is established between the subscribing user (e.g., watcher), and the contact (also known as a "presentity").

Although SIP, XMPP, and other presence systems provide some degree of presence awareness, there are problems with the existing schemes. One problem is that when a user submits a subscription request for multiple contacts' presence, individual presence subscriptions for each contact are generated by the presence server. Each presence subscription requires Access Control List (ACL) privacy policy processing and the creation of individual dialogues and/or individual subscription and notification requests. These individual presence subscriptions are costly in terms of central processing unit (CPU) usage and network bandwidth.

For example, in a SIP protocol, subscribing to multiple contacts' presence information creates individual SIP sessions including individual subscription requests (e.g., SUBSCRIBE requests) and corresponding individual notification requests (e.g., NOTIFY requests) for each contact. Also, SIP presence subscriptions are short-lived, and are terminated almost instantaneously when the search results are displayed. This creates a problem of increased processing requirements because users must request subscriptions multiple times to display updated subscription results. In the case of an XMPP protocol, subscribing to multiple contacts' presence information creates roster updates (e.g., contact list updates) that require a roster "push" to users (e.g., contacts' presence information changes are sent to users when updated). In addition, in an XMPP protocol, to remove a subscription requires sending an unsubscribe request (or cancellation of the subscription), which is likewise subject to individual processing and roster updates. Further, in both SIP and XMPP protocols, presence subscriptions update watcher information (e.g., information provided to a watcher, which is a component that monitors presence information), which requires additional processing related to watcher information management. Thus, these individual presence subscriptions and associated management of the subscriptions are costly in terms of CPU usage and network bandwidth.

The cost of individual presence subscriptions becomes even more apparent when considering a situation of medium or large scale deployment of presence systems. For example, consider the case of a large size business using a presence system. Some organizations may have 5,000-10,000 users. If any one percent of the users were to execute subscription requests, this would mean that there are fifty to one hundred simultaneous subscription requests occurring at one time. If there are ten percent of users executing subscription requests, this would generate five hundred to one thousand simultaneous subscription requests. Moreover, if a user desires to subscribe to ten of their contacts, ten corresponding individual subscriptions will be created. If the ten percent of users do this in an organization with 5,000 users, for example, 5,000 simultaneous subscriptions would be created requesting presence information. In the case of SIP, this means 5,000 SUBSCRIBE requests would be almost instantaneously sent out, and in the case of XMPP, 5,000 presence subscribe packets would be almost simultaneously sent out. If the size of the organization is doubled, this at least doubles the number of these requests.

Furthermore, if the above scenarios are considered in the context of a pattern of use that involves a user search facility (whereby the user search facility allows a user to search for any contact (or other user) in an organization, and the resulting set of users from the search is rendered in the client application with a corresponding presence indicator), then it is possible that at any one time this search facility could generate a significant number of individual presence requests to match the user search results. Thus, if each search returned an average of ten contacts, then this would correspond to an instantaneous submission of ten individual presence requests. For ten percent of 5,000 users, this will result in 500 instantaneous presence requests.

In addition, another problem with current presence systems occurs when the presence system is using certain ACL privacy policies. For example, CPU and bandwidth usage, along with customer satisfaction, may become problematic when a presence system is using an ACL privacy policy set to "CONFIRM." In a CONFIRM privacy policy, each contact for which the user is requesting presence information is required to explicitly authorize and confirm their response to any presence subscription request. Such individual confirmations may be executed by a pop up window on the contact's terminal, or other method that solicits the contact's input regarding the presence subscription request. These individual confirmations add to the CPU usage and network bandwidth problems, and some contacts may find frequent pop ups annoying or unacceptable.

Also, a user may have a set of contacts where the contacts are "presence buddies." Being presence buddies means that a long-term presence subscription is established between the user (e.g., watcher) and their contacts (e.g., presentities). However, a user may wish to communicate with other contacts (not presence buddies) on an intermittent basis, and may not have that contact listed on their contact list. Thus, users may use user search facilities to find the contacts; however a contact search will result in individual presence subscribe requests, which is also subject to privacy processing.

SUMMARY

These and other needs are addressed by the various embodiments and configurations of the present disclosure. The following presents a simplified summary of the disclosure to provide an understanding of some aspects of the disclosure. This summary is not an extensive overview of the disclosure and its various embodiments. It is intended neither to identify key or critical elements of the disclosure nor to delineate the scope of the disclosure but to present selected concepts of the disclosure in a simplified form as an introduction to the more detailed description presented below.

In some embodiments, the methods comprise generating an availability request, wherein the availability request inquires about an availability of each contact in a set of multiple contacts; submitting a composite presence subscribe request to a presence server based on the availability request, wherein the composite presence subscribe request identifies each contact in the set of multiple contacts; generating, from the presence server, a composite presence report indicating the availability of each contact; and notifying of the availability of each contact.

In other embodiments, the systems comprise a module operable to receive, from a client, a composite presence subscribe request, wherein the composite presence subscribe request identifies each contact in a set of multiple contacts and requests an availability of each contact in the set of multiple contacts; executes a search based on the composite presence subscribe request to determine the availability of each contact; and returns, to the client, a composite presence report indicating the availability of each contact.

Advantageously, embodiments can address methods of requesting presence information for an ad hoc list of users generated from a user search facility in a unified communications system to reduce processing overhead.

These and other advantages will be apparent from the disclosure contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "module" and "component" as used herein refer to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

The term "contact" may mean an entity that shares a connection or request for connection between two or more communication devices. The terms "user" and "contact" may be interchanged as used herein. For example, users may be subscribed to presence information related to contacts, and contacts may likewise be subscribed to presence information related to users. Users and contacts may belong to a same organization, or belong to different organizations. Users and contacts may know each other, or they may not know each other personally. Further, a user may be a contact at any point in time, or both a user and a contact at the same time (for example, if the user subscribes to contacts, and is also a contact to which other users subscribe). Still further, a user or contact may be in various forms, such as a person, a group, an entity, a set of entities, a process, an automated process, etc.

The above-described embodiments and configurations are neither complete nor exhaustive. As will be appreciated, other embodiments of the disclosure are possible utilizing, alone or in combination, one or more of the features set forth above or described in detail below.

DETAILED DESCRIPTION

Next, a detailed description of embodiments of the present disclosure will be provided with reference to the drawings.

Figure 1:
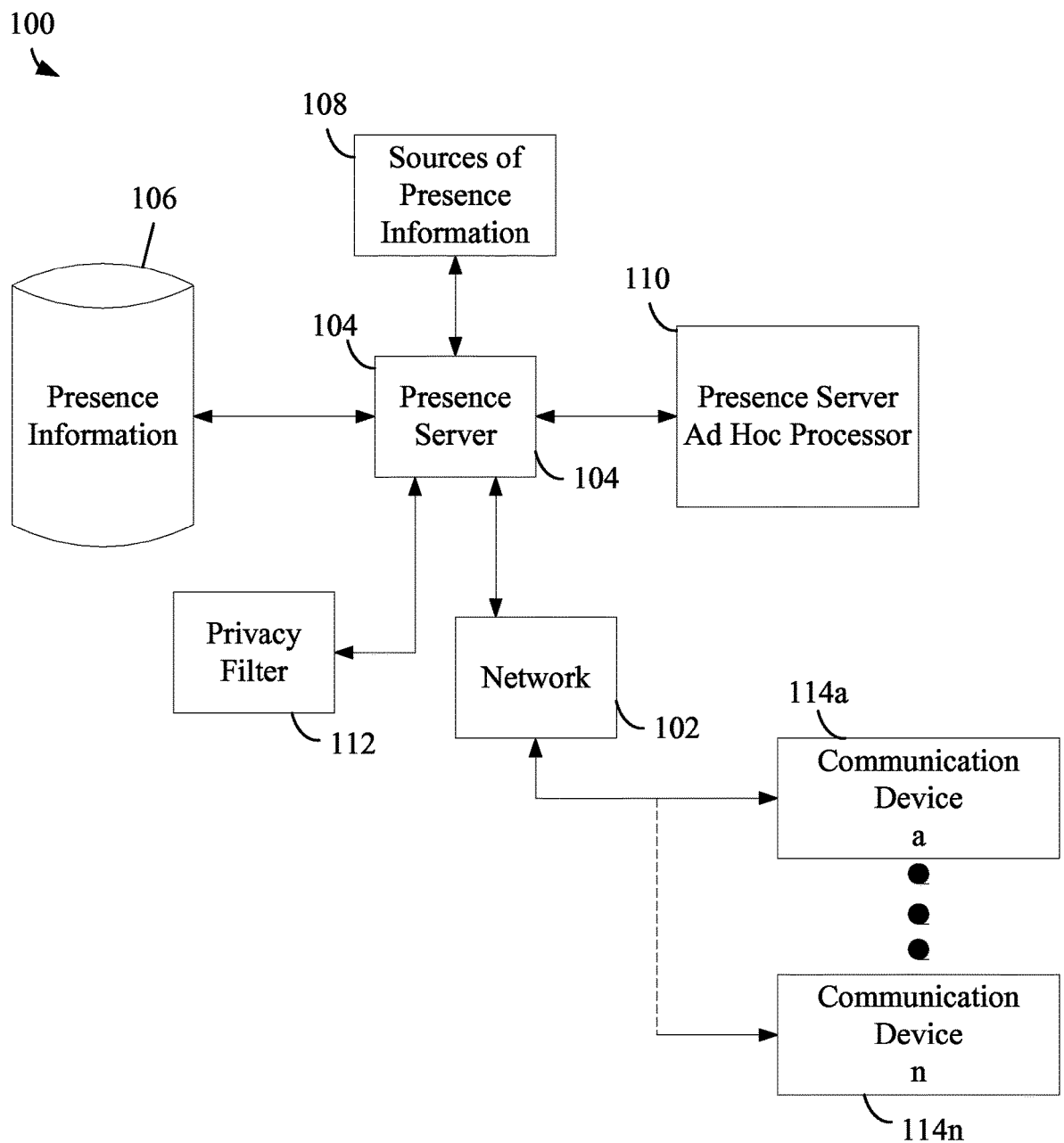
FIG. 1 is a block diagram of an architecture according to embodiments of the present disclosure.

FIG. 1 depicts a presence system 100 according to an exemplary architecture of the present disclosure. Before describing the steps of FIG. 1, it is helpful to understand exemplary presence subscription processes in SIP and XMPP protocols.

In SIP protocols, end systems and proxy servers can provide presence awareness services. For example, SIP protocols provide an extensible framework by which SIP nodes (e.g., a user end) can request notification from remote nodes indicating that certain events have occurred (e.g., current status of contact presence awareness information). Typically, in a SIP protocol, the presence information is communicated and updated via one or more SIP-based messages exchanged, for example, between one or more endpoints and/or one or more application servers. In a SIP protocol, a user determines the presence of any one or more of their contacts by subscribing to contact(s). In some embodiments, the user is a registered user of a SIP application server via a 1XC SIP client, and the presence subscriptions are processed by the IXC SIP client and a presence server, in combination with other servers or databases, and proxies, registrars, and routers for managing packet flows.

In a SIP protocol, a user may generate an availability request at the 1XC SIP client for a list of multiple contacts by searching for a contact or set of contacts in a user search facility. In some embodiments, contact and/or user information has been set up and stored in a component for organizing a set of records, such as a Lightweight Directory Access Protocol (LDAP) or other user search facility for accessing and maintaining distributed directory information. The user search facility may be located on a dedicated server or it may be incorporated into one of the components of the present disclosure. The search results are returned from the user search facility to the IXC SIP client, and the 1XC SIP client creates a subscription list, containing the contact(s) names.

The SUBSCRIBE list is processed by the 1XC SIP client to form a SUBSCRIBE request, which is sent to a presence server. The SUBSCRIBE request is a request for a user to obtain presence information for a particular contact or set of contacts (e.g., current state and state updates from a remote node). For example, for a presence request submitted via an ad hoc list, a search query may be in the body of the request, or it may be sent as a URL encoded query supplied as a parameter in the TO header field of a SIP SUBSCRIBE request. The merging of a user search query into a subscribe request can produce further efficiency in network communications and system usage. Also, the SUBSCRIBE request contains an Expires header, which indicates the duration of the subscription. In order to keep subscriptions effective beyond the duration communicated in the Expires header, users must refresh subscriptions using a new SUBSCRIBE request. A SUBSCRIBE request with an Expires header of zero constitutes a request to unsubscribe from an event (e.g., a contact's presence information) for an existing subscription and within an existing SIP dialog; however a new SUBSCRIBE request, not within an existing dialog, with an Expires header of zero, is termed a presence fetch. A presence fetch will create a subscription and terminate the subscription, and will invoke ACL privacy policy processing and generate watcher information. An ACL privacy policy provides presence security for user presence via the presence server so that presence information may not be misused by malicious entities. An ACL policy may use two complimentary mechanisms: authorization via an ACL policy that controls overall access to a user's presence by a watcher, and an access level that controls privacy filtering of a user's composite presence. The access level controls what presence information a watcher may view. Authorization (e.g., the allowing or blocking of a subscribe request) is applied when the subscribe request is first received. Privacy filtering, which is the application of the access levels, may be applied when subscription requests are fulfilled. Applying ACL privacy policy protects a contact's privacy because presence information is only disclosed to users that a contact has approved. SUBSCRIBE requests may be validated with a response from the presence server.

After receiving a SUBSCRIBE request, the presence server creates or updates watcher information for each of the contacts. The presence server sends the watcher information to the contacts via a NOTIFY response to notify the contacts of the watcher information change. The presence server applies any ACL privacy policy to authorize the subscription. The presence server creates the presence report (e.g., a composite presence document of the presentity), applies any privacy filtering, and sends the NOTIFY request containing the presence information to the 1XC SIP client of the subscribing user or watcher. The 1XC SIP client renders the presence information to the user.

In XMPP protocols, end systems and proxy servers can provide presence awareness services. For example, XMPP protocols provide an extensible framework by which XMPP clients (e.g., a user end) can establish streams with remote nodes via servers, where the streams are used to indicate that certain events have occurred (e.g., indicate the current status of contact presence information). XMPP protocols use rosters (also referred to as contact lists) to track information about a user's contacts, including presence information. Presence subscription status is indicated in both a contact's and user's roster and presence subscription information is updated by a "roster push," where newly created, updated, or deleted roster items are sent from the server to the client. Typically, in an XMPP protocol, presence information is routed by a server to all users that are subscribed to a contact.

In an exemplary XMPP protocol, presence subscriptions are processed by a IXC H323 client and a presence server, in combination with other servers or databases for managing packet flows, where a user is a registered user of an XMPP application via a 1XC H323 client. The user may generate an availability request using a list of multiple contacts and a search user facility. For example, in the case of an XMPP request to an ad hoc list, a query may be encapsulated in a query field of a subscribe request. The merging of a user search query into a subscribe request can produce further efficiency in network communications and system usage.

In certain embodiments, the search user facility may be a LDAP. As described above, contact and/or user information may be set up and stored in a LDAP or other user search facility for accessing and maintaining distributed directory information services. The user search facility may be located on a dedicated server or it may be incorporated into one of the components of the present disclosure. The search results are returned to the 1XC H323 client and the 1XC H323 client processes the list of contacts and sends presence subscribe packets for each individual contact on the list to a presence server. Thus, in an XMPP protocol, a user subscribes to presence information of various contacts by sending presence subscribe packets to a presence server to establish a presence subscription.

Upon receiving the presence subscribe packets from the 1XC H323 client, the presence server updates the contact's and/or user's rosters and updates watcher information (e.g., information about subscribed contacts). In some embodiments, the presence server sends roster updates and/or watcher updates to each contact and/or user. The presence server applies any ACL privacy policy to authorize the subscriptions, applies any privacy filtering, and creates a presence report for the user. The presence server sends the presence notification containing the presence information to the 1XC H323 client. The 1XC H323 client renders the presence information to the user. In XMPP protocols, presence subscriptions do not expire. The presence subscription is ended when the contact/watcher unsubscribes or the presentity user cancels the watcher's presence subscription.

Further, presence information can be user configurable, e.g., the contact can configure the number and type of communication and message devices (endpoints) with which they can be contacted and define profiles that govern the communication and message options presented to the incoming contact or in specified factual situations or sets of facts. By identifying a pre-defined set of facts, a profile can be accessed and followed to direct the user to the contacts' preferred device(s) and mode(s) of communication.

With respect to various presence subscription protocols and in various embodiments of the disclosure, a composite presence subscribe request may be generated internally within the presence server (containing an ad hoc indicator flag). The composite presence subscribe request may also be referred to as an ad hoc list subscribe request, and these requests provide efficient processing by avoiding ACL authorization, and roster and watcher updates. By only returning overall availability, the amount of presence information processing is reduced, as explained below.

Turning to FIG. 1, FIG. 1 will be described according to some embodiments of the present disclosure. In FIG. 1, the presence system 100 comprises a communication network 102 (a packet-switched network is one example of a communication network 102). Other examples include the public switched telephony network (PSTN), a wide area network (WAN), such as the Internet, a local area network (LAN), a private branch exchange (PBX), a wireless communication network, a paging network, and various embodiments of different networks. The presence system 100 further comprises a plurality of communication devices 114*a-n* in communication with the network 102, a presence server 104, a presence information database 106, sources of presence information 108, a privacy filter 112, and a presence server ad hoc list processor 110. Methods for requesting, generating, and notifying of composite presence according to the disclosure may be implemented according to embodiments depicted in the architecture of FIG. 1.

In relation to FIG. 1, users and contacts interact with presence server 104 via network 102 and communication devices 114*a-n*. The presence server 104 may be a single point of reference for all presence information associated with users and contacts. The presence server 104 may process a users presence from multiple sources, including SIP and XMPP, and information collected from corporate and third party sources. As discussed above, in a SIP protocol, a user interacts with the network 102 via a 1XC SIP client. In an XMPP protocol, a user interacts with the network 102 via a 1XC H323 client. The packet-switched network 102 can be any data and/or distributed processing network, such as the Internet. The network 102 typically includes proxies, registrars, and routers for managing packet flows.

The plurality of communication devices 114a-n can be any type of communicating device, whether configured for circuit-switched or packet-switched networks, including, for example, IP hardphones such as the Avaya, Inc. 6400™, 2420™, and 4600™ series phones, laptops, modems, wired and wireless telephones, headsets, computing tablets, wearable communication devices, or any device capable of hosting software applications providing communications services such as e-mail clients, browsers, softphones, instant messaging, chat, audio conferencing, etc. or devices that offer a combination of any such services.

The presence server 104 collects presence information and may store the collected information in a presence information database 106, which provides presence information about one or more users of the communication devices. In some embodiments, the presence server 104 may collect presence information from the sources of presence information 108. The presence server 104 may collect presence information regarding the user's interaction with the various entities of FIG. 1, and/or other information provided directly or indirectly by the user, when those entities provide their information to the presence server 104. The presence server 104 can interact with additional presence services (not shown) that continually collect and redistribute availability data from publishing sources authorized by the user.

The presence server 104 provides presence information to other network entities in response to presence subscription requests. The presence server 104 may typically retrieve presence information through a user's identity as opposed to a device address, and in the presence information database 106, presence information may be indexed by a user's identity rather than device address. In various embodiments, the presence server 104 may apply ACL privacy policy to the presence information, or provide other privacy management using privacy filter 112. The presence information component 108, the presence information database 106, and the privacy filter 112, may each be a component that is incorporated into the presence server 104 or other components, or they may each be a component that is distinct from the presence server 104 or other components.

The presence server ad hoc list processor 110 processes presence subscriptions requests. In particular, the presence server ad hoc list processor 110 formats composite presence reports, as described below.

Figure 2:
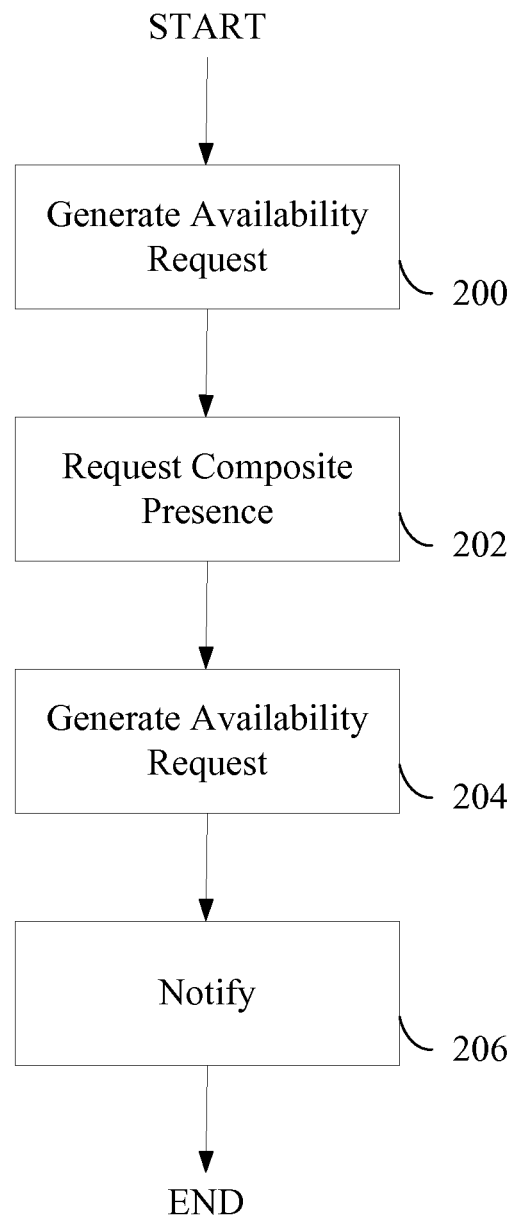
FIG. 2 is a flowchart according to some embodiments of the present disclosure.

Turning now to FIG. 2, FIG. 2 is a flowchart of embodiments of the present disclosure for presence subscriptions for multiple contacts.

In step 200, a user generates an availability request for a contact or a set of contacts to request information regarding their presence status. In some embodiments, the contacts are contacts that the user has not previously subscribed to for presence information. In some embodiments, the user may search for contacts by performing a LDAP search and the contact search results are returned to the 1XC SIP client or 1XC H323 client, and the client generates the composite presence subscribe request. In other embodiments, the user may generate an availability request without using a user search facility; instead, the availability request may be generated solely at the client (for example, a 1XC SIP client in a SIP protocol and a 1XC H323 client in an XMPP protocol).

In step 202, after receiving the availability request (e.g., user search result list), the client generates a composite presence subscribe request. In some embodiments, the composite presence subscribe request is created as an ad hoc subscribe list encapsulated in a single subscription request, where the processing does not invoke authorization processing, individual subscription/notification processing, and/or roster processing. Thus, in certain embodiments, the processing of the availability request to be a composite presence subscribe request does not invoke ACL privacy policy.

For example, in a SIP protocol, the 1XC SIP client processes the availability request to create a composite presence subscribe request by encapsulating an ad hoc subscription list in a single SUBSCRIBE request. More specifically, a subscription list is added to the body of a SUBSCRIBE request, and a parameter of "list=ad hoc" is added to the TO address with an Expires header value of zero.

In an XMPP protocol, the 1XC H323 client processes the availability request to create an ad hoc subscription list encapsulated in a single subscribe packet to create a composite presence subscribe request. More specifically, a subscription list is added to the body of a subscribe packet, and a parameter of ad-hoc-list-processor.<ps-domain> is added to the TO address.

In alternative embodiments, the 1XC SIP client or 1XC H323 client may format the composite presence subscribe request to contain a search query in the body of the request (e.g., in the body of the SUBSCRIBE request or in the body of the subscribe packet), instead of a subscription list. In such embodiments, the search query is executed against the presence server 104 and presence information database 106, for example, so that the presence server 104 constructs a subscription list internally. The subscription list is then processed as described below.

In step 204, the client generates a composite presence report using, for example, the composite presence subscribe request, the presence server 104, and the ad hoc list processor 110.

In SIP protocols, the 1XC SIP client generates a composite presence report using an additional component called the AdHocSubscriptionManager. The AdHocSubscriptionManager is a component that may be added to the presence server 104. The 1XC SIP client processes the composite presence subscribe request using the AdHocSubscriptionManager to process the SUBSCRIBE request in order to invoke the presence server ad hoc list processor 110. The presence server ad hoc list processor 110 creates a presence composition request for each contact in the composite presence subscribe request by extracting the subscription list from the composite presence subscribe request (e.g., from the SUBSCRIBE request). The presence server ad hoc list processor 110 sends a presence composition request to the presence server 104, which returns the requested presence information. The AdHocSubscriptionManager processes the presence information from the presence server 104 to extract each contact's presence information and place it into a NOTIFY report. The NOTIFY report is returned to the 1XC SIP client.

In SIP protocols, the composite presence subscribe request processing described above does not create individual SIP sessions or corresponding individual subscription requests (e.g., SUBSCRIBE requests) and corresponding individual notification requests (e.g., NOTIFY requests) for each contact. This is because of the creation of the composite presence subscribe request and the subsequent processing performed by the presence server ad hoc list processor 110 in conjunction with the 1XC SIP client. In addition, watcher information is not updated, thereby avoiding associated watcher update notification processing. In various embodiments, setting the ad hoc flag in the SUBSCRIBE request within the composite presence subscribe request modifies privacy processing such that ACL privacy policy is not invoked and only overall presence information is returned in the composite presence report. Further, by setting the ad hoc flag in the SUBSCRIBE request within the composite presence subscribe request, the privacy settings of the contact may be retained even though the ACL privacy policy processing is not invoked.

In XMPP protocols, the 1XC H323 client processes the composite presence subscribe request and uses XMPP discovery to obtain the name of the presence server ad hoc list processor 110. The 1XC H323 client then sends a presence subscribe packet containing an embedded composite presence subscribe request directly to the presence server ad hoc list processor 110. The presence server ad hoc list processor 110 creates a presence composition request for each contact in the composite presence subscribe request by extracting the subscription list from the composite presence subscribe request (e.g., from the presence subscribe packet). The presence server ad hoc list processor 110 sends a request for composite presence to the presence server 104, which returns the requested presence information. The 1XC H323 client extracts each contact's presence information from the presence information returned by the presence server 104 and places it into a NOTIFY report.

In XMPP protocols, the composite presence subscribe request processing described above does not create individual roster subscriptions and their corresponding roster pushes. In addition, watcher information is not updated, thereby avoiding associated watcher update notification processing. In various embodiments, the ad hoc flag in the composite request subscribe packet is set to modify privacy filter processing such that only general presence information is returned. Further, by setting the ad hoc flag in the subscription packet for composite presence information, the privacy settings of the contact may be retained although the privacy ACL privacy policy processing is not invoked. Moreover, the composite presence subscribe request processing does not result in individual presence subscribe packets being submitted to the presence server 104 and the composite presence subscribe request processing does not result in persistent presence subscriptions (e.g., where the presence subscriptions must be explicitly cancelled or unsubscribed). Thus, the composite presence subscribe request processing for an XMPP protocol thereby avoids creating additional processing that would otherwise be caused by individual processing of presence subscribe packets and unsubscribe requests.

In step 206, the client notifies the user of the results contained in the composite presence report. In some embodiments, the client formats the presence information and renders a composite presence report to the user. In certain embodiments, the composite presence report contains general presence information about the contacts, as described in FIG. 4. In other embodiments, the composite presence report may contain rich presence information about the contacts, as described in FIG. 5.

The notification may be provided to the user in any suitable manner; for example, it may be a displayed notification, an audio notification, or a combination thereof. It can be configured as an icon displayed on a Graphical User Interface (GUI), as a tone or beep or whisper on a Telephone User Interface (TUI), or a notification superimposed on other information, or accessible via a speech interface command, etc. Moreover, the notification may be configured in any manner by network administration or by the user or contact themselves.

In various presence systems, the composite presence report is created using Resource List Meta-Information (RLMI) and presence multi part related mime attachments containing the presence information of each user in the subscription list. The response, containing the RLMI metadata and the composite presence as mime attachments, may be embedded in the presence information returned from the presence server 104. In some embodiments, reports are interchangeable between presence system protocols. In other words, the 1XC SIP client and the 1XC H323 client may use a common module for processing composite presence reports.

Figure 3:
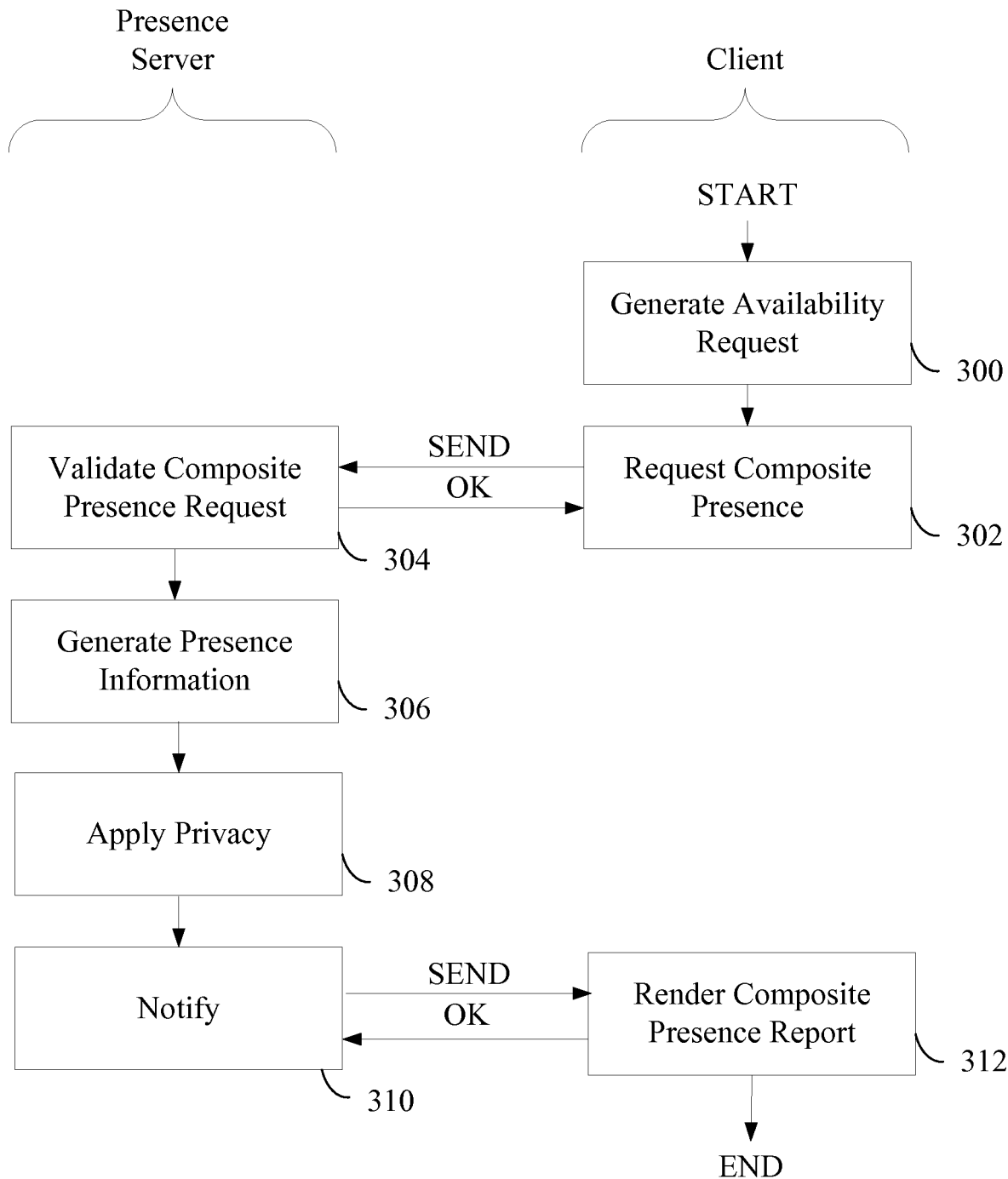
FIG. 3 is a flowchart according to some embodiments of the present disclosure.

Turning now to FIG. 3, FIG. 3 is a flowchart according to some embodiments of the present disclosure.

In step 300, a user generates an availability request for a contact or set of contacts. As described above, the user may use a user search facility to search for contacts, or the user may generate the availability request without using a user search facility. The availability request is provided to the client, for example a 1XC SIP client or a 1XC H323 client.

In step 302, the client requests the presence for a set of contacts by generating a composite presence subscribe request. As discussed above, the composite presence subscribe request may be an ad hoc subscribe list encapsulated in a single subscription request (e.g., a SUBSCRIBE request or a presence subscribe packet), or it may be a query within a single subscription request. In the case of a SIP protocol, processing of the composite presence subscribe request does not create individual SIP sessions or corresponding individual SUBSCRIBE requests or NOTIFY requests. Also, in the case of an XMPP protocol, processing of the composite presence subscribe request does not create individual roster subscriptions and their corresponding individual update notifications for each contact. Further, processing of the composite presence report does not update watcher information and thereby avoids associated watcher update notification processing.

The composite presence subscribe request is created by the client and sent to the presence server ad hoc list processor 110, as described above, and sent to the presence server 104. The ad hoc list processor 110 may be an integral part of the presence server 104.

In step 304, the client sends the composite presence subscribe request to the presence server 104, and the presence server 104 validates the composite presence subscribe request and returns an OK message to confirm the request.

In step 306, the presence server 104 generates presence information by gathering the presence information associated with each of the contacts in the subscription list within the composite presence subscribe request. This may result in the retrieval of each user's composite PIDF/Rpid (Presence Information Data Format/Rich Presence Information Data format) presence document.

In step 308, the presence server 104 applies privacy filtering to the composite presence information. In certain embodiments, the privacy filtering may be applied using the privacy filter 112. As described above, by setting the ad hoc flag in the composite presence subscribe request, the privacy settings of the contact may be retained although the ACL privacy policy processing is not invoked. The application of privacy filtering removes all the rich presence tuple elements and returns only the user's overall presence availability in a person element of the composite presence document. This is the default policy for ad hoc composite presence, where the user ACL policy is set to CONFIRM. This may be altered to return full rich presence in the composite PIDF/Rpid document, when a system level ALLOW ALL ACL policy exists.

In step 310, the presence server 104 notifies the client of the presence information via a NOTIFY report. The NOTIFY report contains presence information for the contacts contained in the subscription list, subject to the privacy filtering.

In step 312, the client receives the NOTIFY report, formats the information, and renders a composite presence report to the user. In certain embodiments, the composite presence report contains general presence information about the contacts, as described in FIG. 4. In other embodiments, the composite presence report may contain rich presence information about the contacts, as described in FIG. 5.

Figure 4:
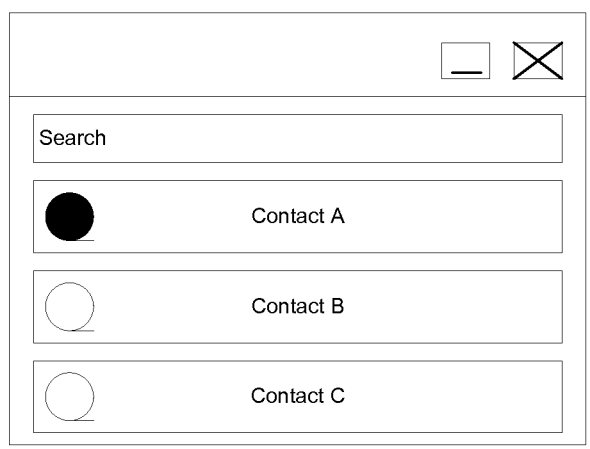
FIG. 4 is a screenshot according to some embodiments of the present disclosure.

Turning to FIG. 4, FIG. 4 is a screenshot according to some embodiments of the present disclosure. FIG. 4 depicts an illustrative user interface showing a composite presence report containing general presence information about the contacts. In some embodiments, the general presence information is information provided by the presence server 104 without invoking individual subscription/notification processing, watcher update notification processing, and/or ACL privacy policy processing. Also, the composite presence report may include only an overall availability of a contact, with rich presence information details not obtained, and therefore not rendered.

Figure 5:
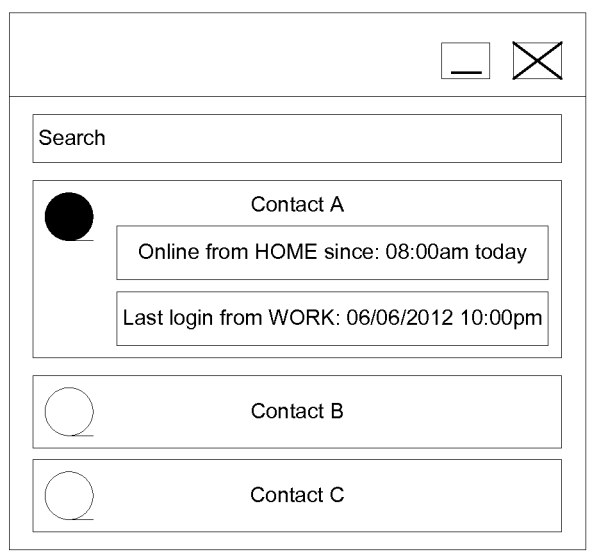
FIG. 5 is a screenshot according to some embodiments of the present disclosure.

Turning to FIG. 5, FIG. 5 is a screenshot according to some embodiments of the present disclosure. FIG. 5 depicts an illustrative user interface showing a composite presence report containing rich presence information about the contacts. In certain embodiments, a user may request rich presence information in addition to, or in combination with, the composite presence request. The rich presence information may be provided in addition to, or in combination with, the general presence information rendered according to the composite presence subscribe request, as described above. In other words, in addition to receiving the composite presence report containing general presence information, a user may request, from the client, a rich presence information request for at least one contact in the set of multiple contacts. In some embodiments, the client may process the request by invoking ACL privacy policy processing to obtain additional detail regarding the one or more contacts' presence information, thereby obtaining rich presence information.

In certain embodiments, the rich presence information may be generated after the contact subscribes to a presence subscription request. For example, the rich presence information may be generated when the presence system uses a CONFIRM privacy policy, where the contact(s) for which the user is requesting rich presence information are required to confirm their response/subscription to any presence subscription request. Such individual confirmations may be executed by a pop up window on the contact's terminal, or by another method that solicits the contact's input regarding the presence subscription request.

Figure 6:
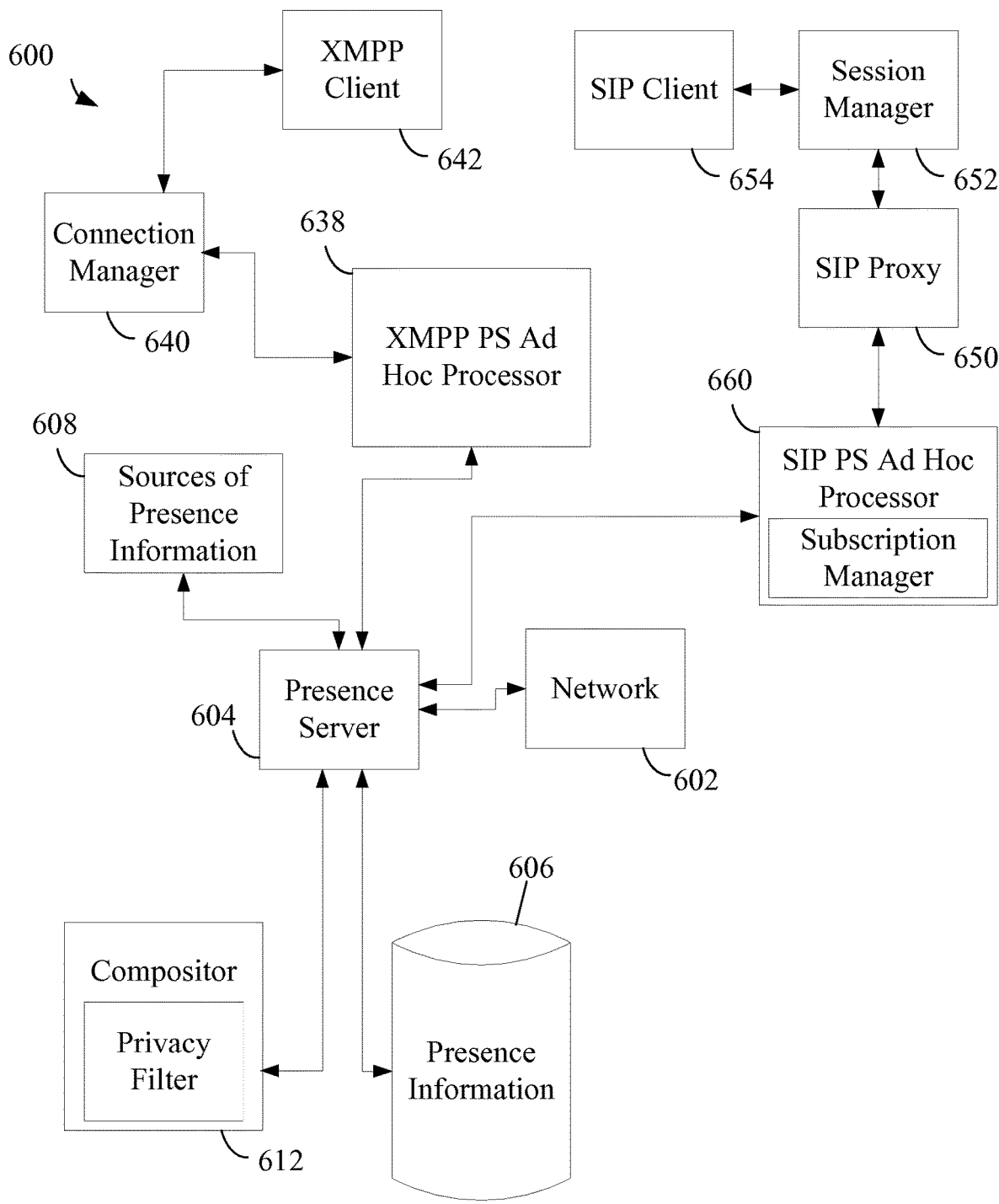
FIG. 6 is a block diagram of an architecture according to embodiments of the present disclosure.

Turning to FIG. 6, FIG. 6 will be described according to some embodiments of the present disclosure. In FIG. 6, the presence system 600 comprises a communication network 602. The presence system 600 further includes a presence server 604 in communication with the network 602, a presence information database 606, sources of presence information 608, a compositor including a privacy filter 612, a XMPP presence server (PS) ad hoc list processor 638, a connection manager 640 for managing communications between the XMPP presence server ad hoc processor 638 and the XMPP client 642, a SIP presence server (PS) ad hoc processor including a subscription manager, and a SIP proxy 650 and sessions manager 652 for managing communications between the SIP presence server ad hoc processor 660 and the SP client 654. The compositor and privacy filter may be two distinct components, or incorporated into one component, as shown. Likewise, the SIP presence server ad hoc processor may be a distinct component from the subscription manager, or they may be incorporated into one component, as shown. Methods for requesting, generating, and notifying of composite presence for SIP and XMPP protocols according to the disclosure may be implemented according to embodiments depicted in the architecture of FIG. 6.

In relation to FIG. 6, users and contacts interact with presence server 604 via the XMPP client 642 and/or the SIP client 654. The presence server 604 may be a single point of reference for all presence information associated with users and contacts. The presence server 604 may process a user's presence from multiple sources, including SIP and XMPP, and information collected from corporate and third party sources. The presence server 604 collects presence information and may store the collected information in a presence information database 606, which provides presence information about one or more users of the communication devices. In some embodiments, the presence server 604 may collect presence information from the sources of presence information 608.

The presence server 604 provides presence information to other network entities in response to presence subscription requests. In a XMPP protocol, the XMPP ad hoc processor 638 handles the processing of ad hoc list requests. The XMPP client 642 uses XMPP discovery to obtain the name of the ad hoc component (e.g., the XMPP presence server ad hoc processor 638) and sends ad hoc subscription requests directly to the XMPP presence server ad hoc processor 638. In a SIP protocol, an additional component (e.g., a subscription manager) may be added to the SIP presence server ad hoc processor 660. The subscription manager handles the translation of a SIP SUBSCRIBE for an ad hoc list to an internal invocation on the SIP presence server ad hoc processor 660, and also handles the corresponding translation of the presence notifications from the SIP presence server ad hoc processor 660 into a SIP NOTIFY.

At the XMPP client 642 and the SIP client 652, ad hoc subscription requests are created and encapsulated into single requests. The processing of the ad hoc subscribe list requests is structured such that presence for members on the list may be retrieved without activating authorization processing and roster processing by using internal composite presence queries to bypass authorization processing, and with an ad hoc flag set to modify privacy filter processing such that only a contact's overall presence is returned.

The XMPP presence server ad hoc processor 638 and the SIP presence server ad hoc processor 660 create a composition request (e.g., a request for composite presence) for each user in the subscription list from the composite presence subscribe request, iterating over the contacts of the subscription list, and sending a presence composition request to the compositor 612. The compositor 612 processes the composition requests and fabricates a composite presence document where the compositor generates a user's/contact's overall presence availability and places this in a person element of a composite presence document. In addition, the compositor applies a privacy filter, where the ACL access levels between the user and the watcher/contact are applied, and any ad hoc subscribe policy is applied, which will, by default, filter all the tuple/channel presence from the composite presence report, leaving the user's overall presence in the person element. The composite presence document is returned to the ad hoc processor 638 660, which aggregates the composite presence documents into a composite presence report and returns the composite presence report to the connection manager 640 and to the XMPP client 642, or to the SIP presence server ad hoc processor 660 and to the SIP client 654 in a SIP NOTIFY.

Figure 7:
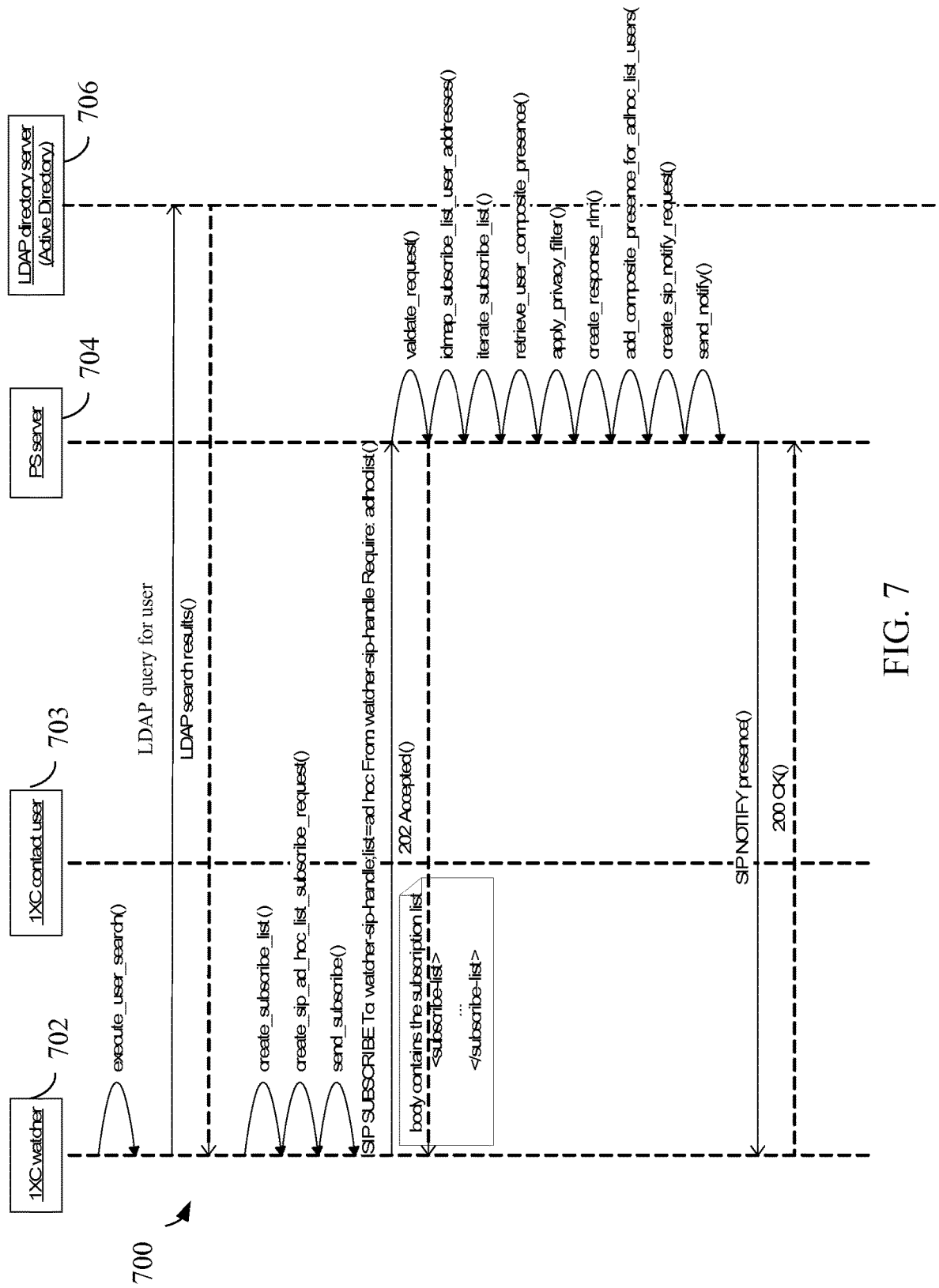
FIG. 7 is an exemplary flow between SIP elements according to embodiments of the present disclosure.

Turning to FIG. 7, FIG. 7 shows an exemplary flow between SIP elements according to embodiments of the present disclosure. Exemplary embodiments of a SIP protocol may involve components of FIG. 6, including the SIP client 654, session manager 652 (e.g., SIP infrastructure components that may include SIP Routers), SIP proxy 650 (e.g., PS SIP proxy), a SIP Presence Server 604 (e.g., SIP PS), its helper subcomponent AdHocSubscriptionManager, a SIP Ad Hoc Processor 660, a PS core server (e.g., presence server 604), and compositor 612.

In SIP embodiments, a subscription list is added to the body of a SIP SUBSCRIBE instead of sending individual subscriptions, and a parameter is added to the TO address of "list=ad hoc," as well as a Expires values equal to 0. A SIP SUBSCRIBE request for presence with an Expires set to zero, is termed a presence fetch and it creates an instantaneous dialog, retrieves presence and expires the dialog immediately. However, these presence fetches are subject to full authorization processing. By adding the ad hoc parameter in the TO header field, the presence server can expedite the processing of the list presence subscription and avoid authorization overhead because the retrieved presence will only contain a user overall availability and not rich composite presence details. This approach makes the SUBSCRIBE request truly "ad hoc" without the subscription state management associated with approaches described in the RFC standards. Additionally, each of the contacts in the subscription list will have their presence retrieved, internally, by a presence composition request, instead of the current temporary subscription method, which is based on the draft IETF standard draft-saintandre-sip-xmpp-media-01.txt, which maps a SIP SUBSCRIBE request to a temporary subscription request. Therefore, no subscription context and no subscription state is created in the flow of FIG. 7.

This SIP embodiment maps the ad hoc subscribe to a composite query retrieval. In the SIP protocol, a request for composite presence (e.g., a presence composition request) is created for each contact/user on the ad hoc subscribe list, which reduces processing overhead and removes the need to apply full authorization ACLs, and allows privacy filtering to be applied instead. The presence composition request is tagged with an ad hoc flag so that only a user's overall presence is returned in the composite presence document, rather than the rich set of tuples that would normally be returned in a composite presence document. SIP embodiments may be further refined through privacy filtering policy, which can be set through configuration parameters in the composition component, which would also reduce the processing overhead in the CONFIRM ACL scenario while retaining the privacy setting of a contact/user. In embodiments, this can be a configurable option. The presence documents, retrieved for the ad hoc subscription list users, are packaged into a presence notify body using RLMI and multipart related mime attachments as described in RFC 4462 for SIP event list subscriptions.

By avoiding the creation of an internal temporary subscription, and using a query for composite presence, this embodiment mitigates updates of watcher information, and its associated distribution to search contacts/users. This thereby further reduces processing overhead and eliminates unnecessary information updates.

In addition, this embodiment takes a search query in the body of the request, instead of a subscription list. The search query is executed against the presence server's user database, and constructs a subscription list internally. The subscription list is processed as described above, with the same NOTIFY presence response being fabricated. This removes the need to execute an LDAP search, prior to requesting presence, and it further reduces communications, network, and processing overhead.

Thus, an exemplary request flow between a 1XC watcher 702 (e.g., SIP client), a 1XC contact user 703, and a PS server 704 using a LDAP directory 706 for ad hoc LDAP search contacts is as follows:

```
end user executes ldap search for a user or set of users
ldap search results returned to 1XC SIP client
1XC SIP client creates a subscribe list document
1XC SIP client creates SIP SUBSCRIBE request to self with list="ad hoc"
parameter, expires = 0 and body containing ad hoc subscription list.
1XC SIP client sends SIP SUBSCRIBE request.
PS receives SIP SUBSCRIBE ad hoc list request.
PS validates SUBSCRIBE request.
PS send 202 accepted response.
For each user in list PS queries for composite presence
PS creates RLMI document
PS gathers composite presence responses adds to RLMI document into
a single
NOTIFY ad hoc request.
PS sends NOTIFY ad hoc list
1XC SIP client receives NOTIFY ad hoc list
1XC SIP client extracts overall presence of each user in presence
documents and renders overall presence in search window for
each contact.
```

In embodiments, when incorporating a user search query in the SIP SUBSCRIBE request, the query may be added as a URL encoded parameter in the TO header field so that the TO header takes two additional parameters, one declaring the SUBSCRIBE request to be for an ad hoc list (e.g., list=ad hoc), and a second that is a URL encoded form of the query request, (e.g., ?query&username=<user query expression>). This provides an efficient method for the user query to be incorporated into the SUBSCRIBE request and to eliminate the need to send individual subscribe requests for each contact in the search result.

In embodiments, a SIP client creates a composite presence subscribe request (e.g., an ad hoc list SUBSCRIBE request) and the SIP SUBSCRIBE contains a TO address header field with a parameter "list=ad hoc." The SIP client sends the SUBSCRIBE request to the presence server via the SIP routing infrastructure and the PS SIP proxy routes the request message internally to the SIP PS server process.

An exemplary processing algorithm is outlined below:

```
The SIP PS processing component validates the request
Checks the TO header for list=ad hoc
toHeaderParameters = sipSubscribeRequest.getToHeaderParameters
if ( toHeaderParameters.contains(list= ad hoc) )
  Invokes processAdHocListRequest on the AdHocSubscriptionManager
AdHocSubscriptionManager creates Ah Hoc List Subscribe Context
AdHocSubscriptionManager extracts the subscribe List from
SUBSCRIBE body
AdHocSubscriptionManager create internal subscribe request TO ad-hoc-
```

-continued

```
list-processor component
AdHocSubscriptionManager sends ad hoc list to ad-hoc-list-processor
Ad-hoc-list-processor receives subscribe request
Ad-hoc-list-processor creates SubscribeContext
Ad-hoc-list-processor extracts subscriber list from request
For each contact user in subscribe-list
    Create composition request contact user's presence
    Send composition request to Compositor.
    Create RLMI metadata
    Create CompositionResponseListener
    Add RLMI metadata to CompositionResponseListener
Add CompositionResponseListener to CompositionResponseManager
Compositor receives composition request
Compositor creates composite presence
Compositor invokes AvailabilityCalculation to generate overall
availability
Compositor add overall availability to person element of composite
presence
Compositor invokes PrivacyFiltering
    If composition == adHocRequest
        If ACL policy != ALLOW ALL
            removePresenceTuplesFromCompositePIDFDocument
Compositor return composition response to Ad-hoc-list-processor
Ad-hoc-list-processor extracts response
Ad-hoc-list-processor invokes CompositionResponseManager
processCompositionResponse
CompositionResponseManager adds composite PIDF to RLMI response
If Number of Composition responses == number of watchers in list
    sendPresenceNotification to SIP PS AdHocSubscriptionManager
component
AdHocSubscriptionManager receives ad hoc list subscribe response
Extracts RLMI presence notification
Creates SIP NOTIFY request
Send SIP NOTIFY to requesting client via the SIP Router (Session
Manager).
Client receives and process NOTIFY
Extracts presence details from RLMI message and renders overall
presence in search contact view.
```

Figure 8:
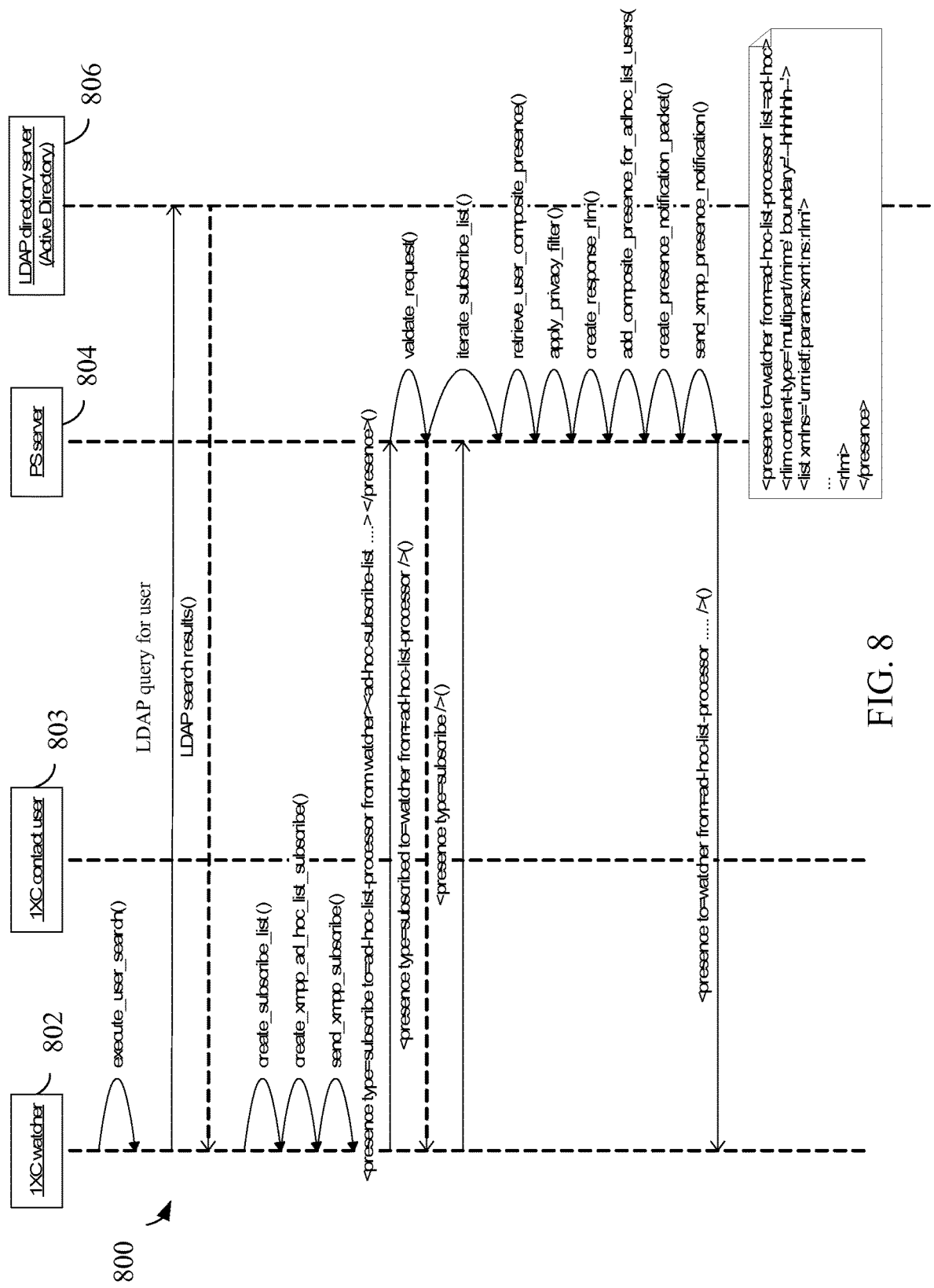
FIG. 8 is an exemplary flow between XMPP elements according to embodiments of the present disclosure.

Turning to FIG. 8, FIG. 8 shows an exemplary flow between XMPP elements according to embodiments of the present disclosure. In exemplary embodiments, the components from FIG. 6 that may be involved include the XMPP client 642 (e.g., 1XC H323), the connection manager 640, the presence server 604, the ad hoc processor 638, and the compositor 612. The connection manager 640 may be a front end XMPP server managing XMPP session and XMPP connections.

In XMPP protocols, an objective may be to remove the individual XMPP subscribe packet from the interaction between the 1XC client and PS because these requests update the roster of both the watcher and the contacts/users, with a corresponding series of roster push (e.g., update) packets being sent from the server to the subscriber/watcher and to the "ad hoc" contacts/users (e.g., search user presentities). This exemplary XMPP embodiment avoids the invocation of ACL authorization, and utilizes ACL privacy filtering instead, similar to the SIP embodiment. In embodiments, the roster pushes and watcher information updates are eliminated, thereby reducing processing overhead, reducing the load on the PS server, and reducing network communication overhead by creating a list subscription, instead of sending individual ad hoc subscribes requests. In some embodiments, the list subscription is sent in a single subscribe packet with an embedded ad hoc subscribe list as a sub element of the subscribe packet.

In embodiments, an XMPP client creates and sends an XMPP subscribe packet, containing the subscription list, as an embedded element, to an ad hoc list processing component within the PS, via the connection manager. The XMPP identifier (e.g., the list processors component JID) is obtained via the XMPP service discovery procedures. The presence subscribe packet has a TO address, which addresses the ad hoc list processor. The component identifier (JID), or component address, has the form ad-hoc-list-processor.<ps-domain>, which is the component JID of the list processor. The XMPP subscribe request carries an embedded subscription list element in a similar format to that used for SIP subscribes to ad hoc lists. The ad hoc list processor receives a subscribe request and processes the list of subscribe users contained within the request, and generates a set of presence composition requests.

These presence composition requests are sent to the composition component so that the XMPP roster is not invoked during this processing, thereby avoiding the creation of subscriptions on the roster and avoiding roster update notifications. In addition, updates of watcher information are avoided. The ad-hoc-list-processor may fabricate a presence response using the response structuring of RLMI, from RFC4662, and presence multi part related mime attachments containing the composite presence of each contact/user in the list. The fabricated presence response, containing the RLMI meta data, and the composite presence as mime attachments, is embedded in the presence notification packet returned from the presence list processor to the subscribing client via the connection manager. In embodiments, this may be the same structure and format that will be used for the SIP equivalent of this proposal and as such, 1XC clients will receive a common format for the ad hoc list subscribe, allowing a common module to handle the ad hoc list responses via either protocol. In other words, the XMPP responses can be essentially the same format and structure as those used in SIP embodiments thereby providing a uniform and consistent structure to SIP and XMPP clients.

Thus, an exemplary request flow between a 1XC watcher 802 (e.g., 1XC H323 XMPP client), a 1XC contact user 803, and a PS server 804 using a LDAP directory 806 for ad hoc LDAP search contacts follows:

```
end user executes ldap search for a user or set of users
ldap search results returned to 1XC SIP client
1XC client creates a subscribe list document
1XC creates XMPP subscribe packet to ad-hoc-list-processor.
1XC adds subscription list to subscribe packet
1XC sends XMPP subscribe.
PS receives ad hoc list subscribe request and delegates to ad-hoc-list-
processor.
For each user in list ad-hoc-list-processor queries for composite presence
(sends a presence composition request to the compositor)
PS ad-hoc-list-processor creates RLMI document
PS ad-hoc-list-processor gathers composite presence responses into mime
attachments of ad-hoc-list presence packet
PS sends ad hoc list presence to 1XC client
1XC client receives ad hoc list presence packet
1XC extracts overall presence of each user in presence documents and
renders overall presence in search window.
```

Further processing may be performed in an exemplary XMPP embodiment. An XMPP client creates a composite presence subscribe request (e.g., an XMPP presence subscribe request) containing an embedded element structure, which contains the ad hoc list of presentity users. The XMPP client sends the presence subscribe to the connection manager and the connection manager creates a subscribe context and a response callback listener, and sends the subscribe request to the Ad-hoc-list-processor via the PS core. This is done as follows:

```
Ad-hoc-list-processor receives subscribe request
Ad-hoc-list-processor creates SubscribeContext
Ad-hoc-list-processor extracts subscriber list from request
For each contact user in subscribe-list
    Create composition request for contact user's composite presence
    Send composition request to Compositor.
    Create RLMI metadata
    Create CompositionResponseListener
    Add RLMI metadata to CompositionResponseListener
Add CompositionResponseListener to CompositionResponseManager
Compositor receives composition request
Compositor creates composite presence
Compositor invokes AvailabilityCalculation to generate overall availability
Compositor add overall availability to person element of composite
presence
Compositor invokes PrivacyFiltering
    If composition == adHocRequest
        If ACL policy != ALLOW ALL
            removePresenceTuplesFromCompositePIDFDocument
Compositor return composition response to Ad-hoc-list-processor
Ad-hoc-list-processor extracts response
Ad-hoc-list-processor invokes CompositionResponseManager
processCompositionResponse
CompositionResponseManager adds composite PIDF to RLMI response
If Composition Response State == Ready
    sendPresenceNotification to Connection Manager component
Connection Manager receives ad hoc list subscribe response
Extracts RLMI presence notification
Rewrites the presence packet with the embedded RLMI using the full
session JID of the watcher
Send presence notification to the requesting client.
Client receives and process NOTIFY
Extracts presence details from RLMI message and renders overall presence
in search contact view.
```

In both of the exemplary SIP and XMPP protocols a list processing subscribe request can take a relatively long time and therefore an initial response may be sent when an ad hoc list subscribe is received. In the SIP scenario, it will be a 202 accepted response. In the XMPP scenario, it will be a presence subscribed packet with an ad hoc list accepted element.

In addition, similar to the SIP query extension, the XMPP subscribe request to the ad-hoc-list-processor can take a query rather than a subscription list. Thus, the ad hoc list subscribe may be a combination of a user search query and a presence subscribe request. The list processor processes the query and translates it into a list of contacts/users to whom a presence probe (e.g., a query for composite presence) is sent. The presence notify will contain RLMI meta data and composite presence documents as multi part related mime attachments.

Thus, exemplary XMPP embodiments may provide an efficient and effective method of support for LDAP generated subscriptions, and also avoids significant overhead in both SIP and XMPP processing of the requests. Additionally, in the XMPP protocol, it may significantly reduce the amount of XMPP network traffic generated by avoiding roster updates and watcher information updates, and mitigate the need to explicitly unsubscribe requests and associated processing.

In terms of handling ACL policy via privacy filtering, various embodiments exist. In some embodiments, only a contact's/user's overall availability is returned in the presence notification, thereby avoiding any negative impact of contravening a user privacy policy, in that none of the rich presence elements (containing the multiple presence tuples) are returned. For an ALLOW ALL policy, the full composite document of a search contact can be returned, or (if the 1XC clients are only interested in the overall presence of search contacts) a contact's overall presence may only be returned without individual channel presence tuples. For a CONFIRM policy, only the overall availability may be returned in the presence notification responses.

Furthermore, as the 1XC clients will only render the overall availability of the search users/contacts and not render the channel presence for all search contacts/users, additional optimization is possible. Rich presence information can then be obtained (e.g., by "promoting" a search contact/user as a full contact and adding that contact/user to the watcher's presence contact list).

The exemplary systems and methods of this disclosure are described in relation to a distributed processing network. However, to avoid unnecessarily obscuring the present disclosure, the preceding description omits a number of known structures and devices. This omission is not to be construed as a limitation of the scope of the disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show certain of the various components of the system as being collocated, certain components of the system can be located remotely, at distant portions of a distributed network, such as a LAN and/or the Internet, or within a dedicated system. Thus, it should be appreciated, that the components of the system can be combined in to one or more devices, such as a communication device rather than a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of other variations and modifications of the disclosure can be used. It would be possible to provide for some features of the disclosure without providing others.

For example in one alternative embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. The features of the embodiments of the disclosure may be combined in alternate embodiments other than those discussed above. This method of disclosure is not to be interpreted as reflecting an intention that the disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the description of the disclosure has included description of one or more embodiments and certain variations and modifications, other variations, combinations, and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method comprising:
receiving, at a presence server comprising a microprocessor, a composite presence subscribe request that incorporates an availability request such that the availability request inquires about an availability of each contact in a set of multiple contacts that includes two different users, and the composite presence subscribe request identifies the each contact in the set of multiple contacts; and
generating, by the microprocessor, a composite presence report that indicates the availability of the each contact, wherein the composite presence subscribe request is a Session Initiation Protocol request that returns the composite presence report that is a single NOTIFY report, and wherein the composite presence subscribe request further comprises an expires=0.

2. The method of claim 1, further comprising notifying, by the microprocessor, of the availability of each contact, wherein the notifying comprises notifying without each contact subscribing to the availability request.

3. The method of claim 2, wherein the notifying comprises the user receiving one notification list containing an indication of the availability of the each contact in the set of multiple contacts.

4. The method of claim 2, wherein the generating the availability request is done by a user of a client.

5. The method of claim 2, wherein the composite presence subscribe request is a Session Initiation Protocol request generated by a 1XC SIP client, the composite presence report is generated using an AdHocSubscriptionManager component on the presence server, and the notifying is done by returning a single NOTIFY report to the 1XC SIP client.

6. The method of claim 1, wherein the composite presence subscribe request comprise a parameter of "list=ad hoc" in a TO address.

7. The method of claim 1, wherein the composite presence subscribe request further comprises an identification of a user set to be retrieved in a Uniform Resource Locator encoded query in the TO address.

8. The method of claim 1, wherein the composite presence subscribe request is an Extensible Messaging and Presence Protocol request that returns the composite presence report in a presence response packet.

9. A system, comprising:
a communications server comprising a microprocessor, the microprocessor programmed to:
receive a composite presence subscribe request, wherein the composite presence subscribe request identifies each contact in a set of multiple contacts that includes at least two different users and requests an availability of the each contact in the set of multiple contacts;
execute a search based on the composite presence subscribe request to determine the availability of the each contact; and
create a composite presence report indicating the availability of the each contact,
wherein the composite presence subscribe request comprises a parameter of "list=ad hoc" in the TO address.

10. The system of claim 9, wherein executing the search comprises executing without each contact subscribing to the composite presence subscribe request, and wherein a privacy of the each contact is considered by applying an Access Control List (ACL) privacy policy.

11. The system of claim 9, wherein the composite presence subscribe request is a Session Initiation Protocol request that returns the composite presence report that is a single NOTIFY report, and wherein the composite presence subscribe request further comprises an expires=0.

12. The system of claim 11, wherein the composite presence subscribe request further comprises an identification of a user set to be retrieved in a Uniform Resource Locator encoded query in the TO address.

13. The system of claim 9, wherein the microprocessor further:
after receiving the composite presence subscribe request, receives, from a client, a rich presence information request for at least one contact in the set of multiple contacts; and
generates the rich presence information.

14. The system of claim 13, wherein generating the rich presence information comprises the at least one contact subscribing to the availability request.

15. The system of claim 9, wherein the composite presence subscribe request is an Extensible Messaging and Presence Protocol request generated by a 1XC H323 client, a parameter of ad-hoc-list-processor.<ps-domain> is added to a TO address, and the composite presence subscribe request includes a subscription list in a body of a subscribe packet.

16. A method comprising:
receiving, at a presence server comprising a microprocessor, a composite presence subscribe request that incorporates an availability request such that the availability request inquires about an availability of each contact in a set of multiple contacts that includes two different users, and the composite presence subscribe request identifies the each contact in the set of multiple contacts; and
generating, by the microprocessor, a composite presence report that indicates the availability of the each contact,
wherein a privacy of the each contact is considered by applying an Access Control List (ACL) privacy policy.

* * * * *

UNITED STATES PATENT AND TRADEMARK OFFICE
CERTIFICATE OF CORRECTION

PATENT NO.         : 10,637,943 B2
APPLICATION NO.    : 13/631396
DATED              : April 28, 2020
INVENTOR(S)        : Mark Sheppard Page 1 of 1

It is certified that error appears in the above-identified patent and that said Letters Patent is hereby corrected as shown below:

In the Claims

At Column 23, Line 2, Claim 6 please delete "comprise" and insert --comprises-- therein.

Signed and Sealed this
Twenty-fifth Day of August, 2020

Andrei Iancu
*Director of the United States Patent and Trademark Office*